United States Patent

Kurokawa

[15] 3,678,184

[45] July 18, 1972

[54] INDEX SIGNAL GENERATING APPARATUS FOR SINGLE TUBE CAMERA

[72] Inventor: Hiromichi Kurokawa, Atsugi, Japan

[73] Assignee: Sony Corporation, Tokyo, Japan

[22] Filed: Sept. 21, 1970

[21] Appl. No.: 73,892

[52] U.S. Cl. ........................................................178/5.4 ST

[51] Int. Cl. ..........................................................H04n 9/06

[58] Field of Search ..................................178/5.4 R, 5.4 ST

[56] References Cited

UNITED STATES PATENTS

| | | | |
|---|---|---|---|
| 3,566,015 | 2/1971 | Watanabe | 178/5.4 ST |
| 2,827,512 | 3/1958 | Stahl et al | 178/5.4 ST |

*Primary Examiner*—Robert L. Richardson
*Attorney*—Lewis H. Eslinger, Alvin Sinderbrand and Curtis, Morris & Safford

[57] ABSTRACT

In a color video signal generating apparatus employing a single image pickup tube photoelectrically converting light projected onto the pickup tube into an electrical output, a screen of parallel cylindrical lenses cooperates with a filter constituted by a simple pattern of different colored filter elements so that light from the object passes through the filter elements and is separated into a plurality of color components whereby a portion of such image corresponding to each cylindrical lens is projected by the lens as separate color components on an effective area of the pickup tube to obtain from the latter a dot sequential chrominance signal, and means including a single light source are provided for projecting a first pattern of alternating light and dark images on the effective area of the pickup tube containing the projected color components and also projecting a second pattern of alternating light and dark images, of different pitch or width from the first pattern, on an area of the pickup tube means adjacent the aforementioned effective area so that the first and second patterns of images establish first and second frequency signals in the electrical output, which signals are utilized to derive a standard signal synchronized in phase with the sub-carrier of the chrominance signal to extract high resolution color video signals having the same sub-carrier frequency from the chrominance signal. Further, an arrangement is provided to control the horizontal scanning velocity of the pickup tube.

11 Claims, 12 Drawing Figures

INVENTOR.
HIROMICHI KUROKAWA
BY [signature]
ATTORNEY

INVENTOR.
HIROMICHI KUROKAWA

BY

ATTORNEY

INVENTOR.
HIROMICHI KUROKAWA
BY
ATTORNEY

INVENTOR.
HIROMICHI KUROKAWA

BY [signature]
ATTORNEY

INVENTOR.
HIROMICHI KUROKAWA

BY [signature]
ATTORNEY

Patented July 18, 1972 3,678,184

7 Sheets-Sheet 6

INVENTOR.
HIROMICHI KUROKAWA

BY [signature]

ATTORNEY

INVENTOR.
HIROMICHI KUROKAWA

BY [signature]

ATTORNEY

INDEX SIGNAL GENERATING APPARATUS FOR SINGLE TUBE CAMERA

This invention relates to a color video signal generating apparatus which produces high resolution sequential color video signals corresponding to the color components of an object to be televised.

Conventional color television cameras generally employ three image pickup tubes and the light from an object to be televised is separated, as by dichroic mirrors or other optical means, into three color primaries which are picked up by the respective pickup tubes to produce color video signals. However, those conventional color television cameras employing three image pickup tubes are inherently bulky and require complicated circuit connections in association therewith.

Color television cameras also have been proposed in the past for the purpose of miniaturization and simplification of the circuit connections which cameras utilize a single image pickup tube in association with a color filter having stripped filter elements placed in front of the tube to obtain from the pickup tube a composite color video signal composed of a non-modulated video signal and a video signal modulated by the stripped filter elements. However, such apparatus presents difficulties in the nature of poor color picture white balance, interference stripes caused by index signal displays, separation of the color signals from the chrominance signals, and apparatus complexity required to insure proper insertion of the index or the standard signal in the output of the pickup tube, which difficulties result in overall picture quality degradation and unduly complex systems. Further, phase synchronization between the chrominance signal and the standard signal is frequently lost during the horizontal blanking period or because of variations in the horizontal scanning velocity of the scanning apparatus.

Accordingly, it is an object of the present invention to provide color video signal generating apparatus which employs a single image pickup tube and is relatively easy and inexpensive to manufacture.

Another object of this invention is to provide an apparatus for generating color video signals which can be easily separated into signals corresponding to each of the several color components of the object being televised.

Yet another object of the invention is to provide a color video signal generating apparatus wherein color images corresponding to the primary colors or other color components are converted into a chrominance signal from which color video signals having the same sub-carrier frequency are extracted to provide color pictures with high resolution and good white balance.

Still another object of the invention is to include an index signal of accurate frequency in the video signals obtained from the pickup tube to facilitate subsequent separation of color signals from the chrominance signal.

Another object of the invention is to synchronize the phase of the standard signal and the chrominance signal to accurately separate the color video signals from the chrominance signal.

Another object of the invention is to control the horizontal scanning velocity of the scanning apparatus in a single image pickup, and to maintain phase synchronization of the standard signal and chrominance signal to produce high resolution color video signals.

In accordance with an aspect of this invention, a lens screen constituted by an assembly of parallel cylindrical lenses is disposed in front of the face plate of a single image pickup tube with the longitudinal axes of the lenses disposed perpendicular to the scanning direction of the tube and cooperates with a filter, constituted by a relatively simple pattern of filter elements of different wave length band pass characteristics in the form of stripes paralleling the longitudinal axes of the cylindrical lenses and disposed in front of the lens screen, so that light from an object to be televised is separated into color components on passage through the filter and a respective portion of the image is separated into color components by each of the cylindrical lenses and projected on the photoconductive layer of the image pickup tube to produce a dot sequential color video signal upon scanning by the electron beam of the tube. Further, means are provided by which first and second patterns of alternating dark and light images are projected on the pickup tube at precisely predetermined positions on adjacent areas thereof. The first pattern of images is projected on the effective area of the pickup tube corresponding to the area thereof containing the projected color components from the filter and the second pattern of images, having a different pitch or width from the first pattern, is projected on the pickup tube in a position adjacent the effective area thereof. The first and second patterns of images establish first and second frequency signals in the electrical output of the pickup tube which signals are utilized to derive a standard signal synchronized in phase with the chrominance signal to extract color video signals, having the same sub-carrier frequency, from the chrominance signal. A control circuit is also provided, in another embodiment of the invention, to control the horizontal scanning velocity of the pickup tube scanning means, thereby to avoid loss of phase synchronization due to variations in that velocity.

The above, and other objects, features and advantages of the invention will be apparent in the following detailed description of illustrative embodiments thereof which are to be read in connection with the accompanying drawings wherein.

Figure 1:
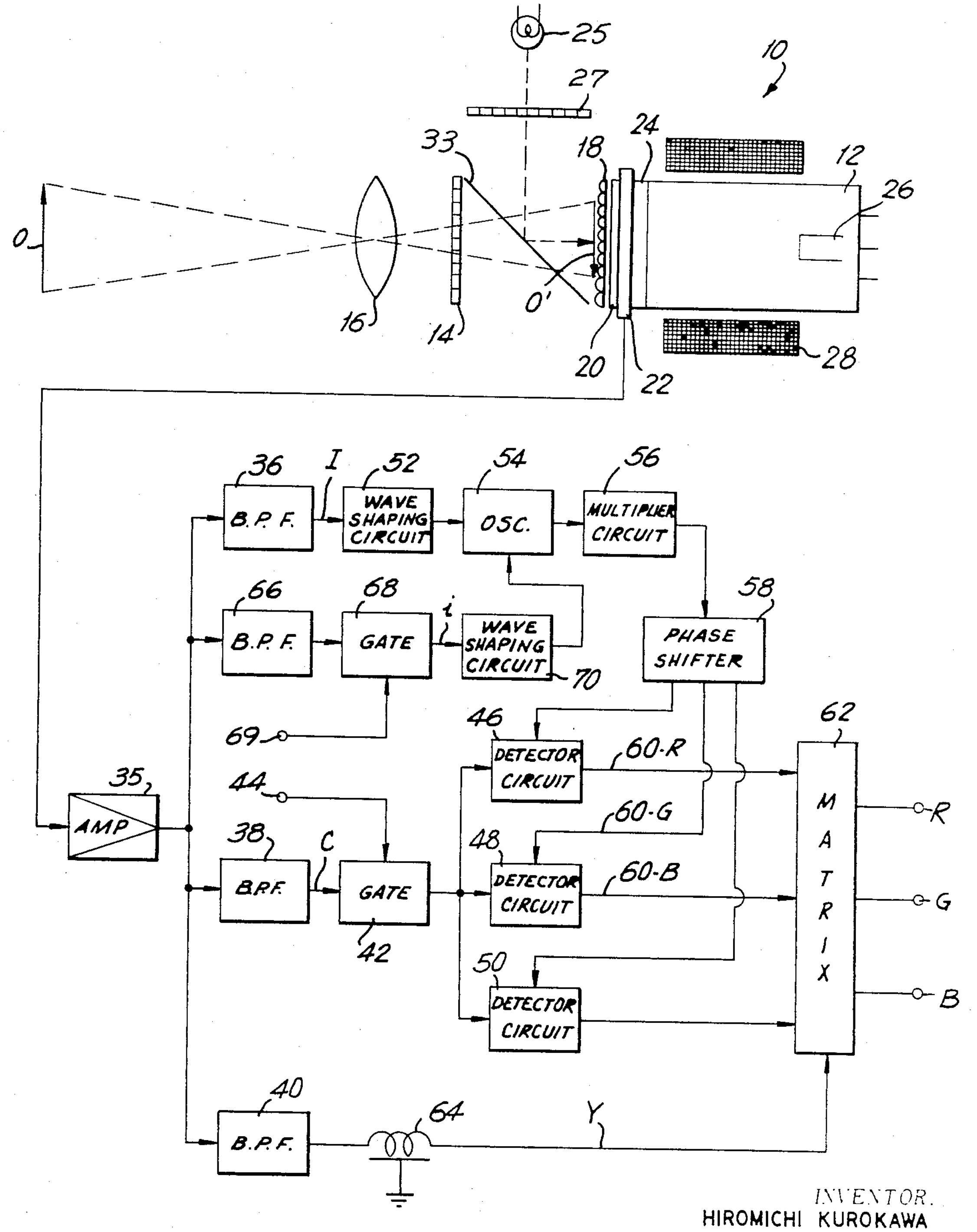
FIG. 1 is a schematic top plan view, partly in section, of color video signal generating apparatus constructed in accordance with one embodiment of this invention.

Referring to the drawings in detail, and initially to FIG. 1, it will be seen that an apparatus 10 for generating color video signals in accordance with this invention generally comprises a single image pickup tube 12, for example, in the form of a vidicon tube, a banded color filter 14, a camera or objective lens 16, and a lens screen 18.

Tube 12 is shown to include the usual face plate 20 having transparent electrode 22 on its inner surface which, in turn, is covered by photoconductive layer 24. An electron gun device 26 is located adjacent the end of the envelope of tube 12 which is remote from face plate 20 to emit an electron beam which is focused on photoconductive layer 24 and made to scan the surface of the latter by means of a beam deflection arrangement indicated as 28. Conventional electronic components are connected with tube 12, and beam deflection arrangement 28, in the usual manner to effect scanning of layer 24. As usual, scanning of layer 24 may be effected by horizontally oscillating the electron beam and successively vertically displacing the beam with the successive oscillations so that the entire useful area of photoconductive layer 24 is cyclically covered by a series of horizontal oscillations.

Figure 2:
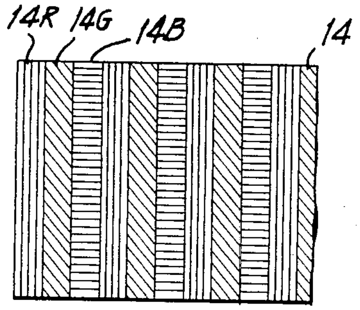
FIG. 2 is a schematic diagram illustrating the color filter employed in the apparatus of FIG. 1.

As shown in FIG. 2, banded color filter 14 consists of a simple pattern of color filter elements 14R, 14G, and 14B of different wave length band pass characteristics, for example, corresponding to red, green and blue colors, respectively, and which are contiguous to each other with generally parallel lines of separation therebetween. Filter 14 is disposed at a predetermined location forwardly of face plate 20 and lies in a plane parallel to the face plate with the filter stripes extending vertically, that is, at right angles to the horizontal scanning direction on photoconductive layer 24.

Lens screen 18, provided in accordance with the present invention, consists of an assembly of cylindrical lenses 18*a*, which are referred to as "lenticules" and which are arranged at regular intervals with their longitudinal axes extending parallel to each other, and parallel to the stripes of color filter elements 14R, 14G, and 14B.

When the camera or objective lens 16 is directed at an object O, a real image O′ of the object will be focused at the plane containing the focusing points of cylindrical lenses 18*a*. Thus the light from object O, directed to each cylindrical lens 18*a*, is separated into color components R, G, B by color filter elements 14R, 14G, and 14B and a portion of the real image O′ of the object corresponding to each cylindrical lens 18*a* is projected onto a portion of photoconductive layer 24 disposed in back of the respective cylindrical lens, in an area (hereinafter referred to as effective area S) corresponding to the area occupied by lenses 18*a* (note FIG. 5), in the form of color images 30R, 30G, and 30B which are separated or displaced relative to each other in the horizontal scanning direction, that is, at right angles to the axis of the cylindrical lenses 18*a*.

Figure 5:
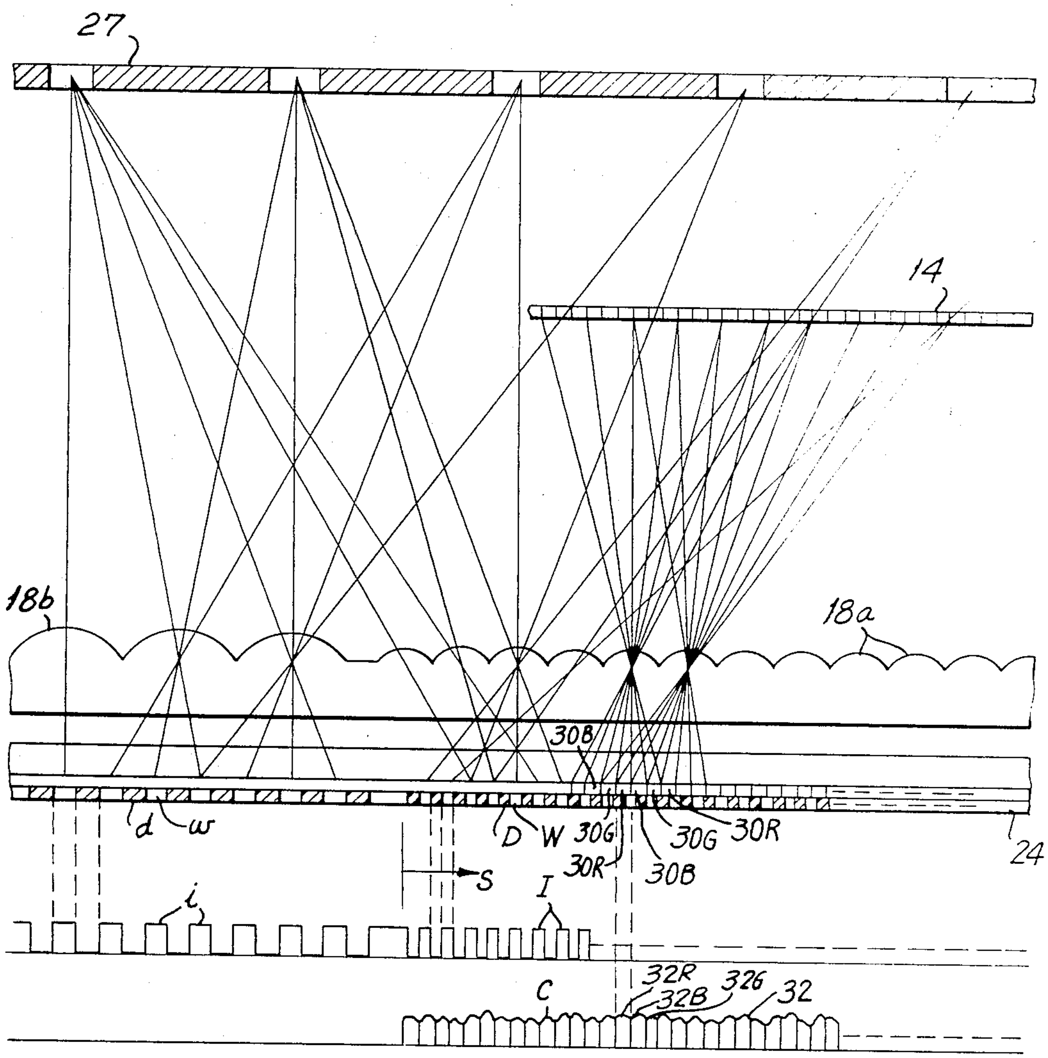
FIG. 5 is an enlarged schematic view illustrating the color separation effected by the lens screen, the light patterns produced by the plate of FIG. 3, and the various signals produced in the electrical output from the pickup tube.

Thus, it is apparent that, when the electron beam emitted by device 26 is deflected horizontally, that is, in a direction across the axes of cylindrical lenses 14*a*, so as to scan photoconductive layer 24, there is obtained a dot sequential chrominance signal C, as shown in FIG. 5, which signal consists of red, green and blue color signals 32R, 32G and 32B, appearing in repeating cyclic order and corresponding to the separated color images 30R, 30G, and 30B projected on photoconductive layer 24, at the portions of the latter corresponding to the locations of cylindrical lenses 18*a*, that is, the effective area S of pickup tube 12.

Figure 3:
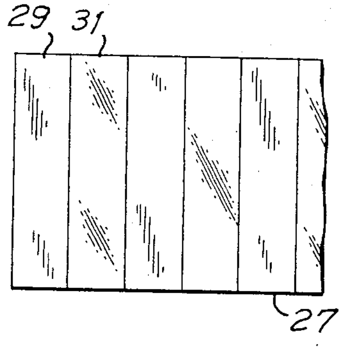
FIG. 3 is a schematic diagram illustrating a plate having alternate opaque and transparent strips for use in producing first and second light patterns on the pickup tube.
Figure 6:
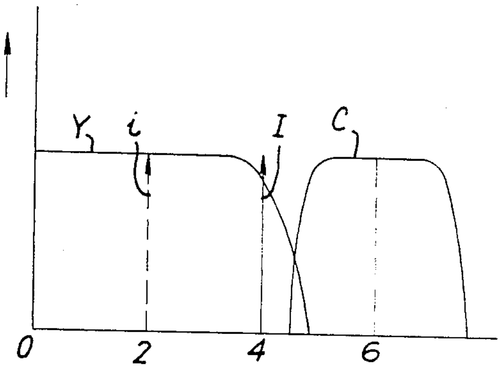
FIG. 6 is a diagram showing the frequency spectrums of the signals produced by the apparatus of the invention.
Figure 4:
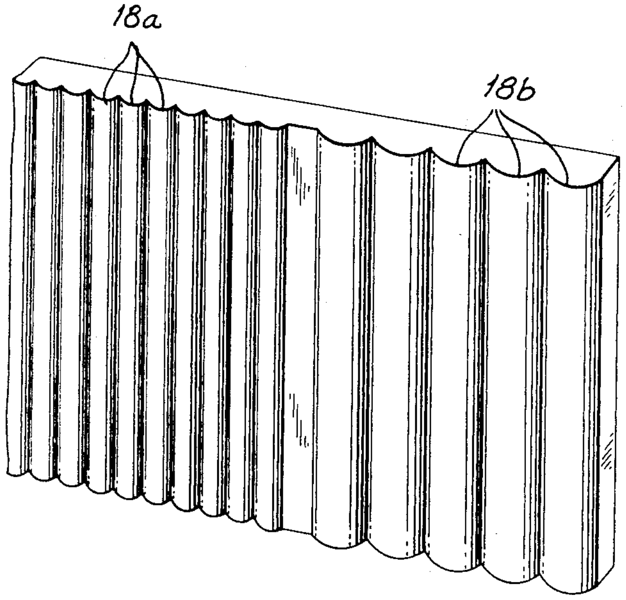
FIG. 4 is a perspective view schematically illustrating a lens screen included in the apparatus of FIG. 1.

In order to produce a reference of index signal for the dot sequential chrominance signal obtained from pickup tube 12, a light source 25 is provided for operation in conjunction with a shading mechanism 27 to project a pattern of alternating light and dark images on photoconductive layer 24 in a predetermined array with respect to the color images 30R, 30G, and 30B. Shading mechanism 27 constitutes a plate, as seen in FIg. 3, having alternately arranged strips 29 and 31 which are respectively transparent and opaque to light from source 25. The light projected from source 25 through plate 27 is reflected by a half mirror 33 disposed between filter 14 and lens screen 18. Mirror 33 permits light from camera 16 and filter 14 to pass therethrough onto lens screen 18 and simultaneously projects an image of light and dark patterns produced by plate 27 onto lens screen 18. Accordingly, each of the cylindrical lenses 18*a* projects an image of the light pattern produced by plate 27 onto photoconductive layer 24. Preferably the number of color strips of filter 14, and the number of light and dark strips 29 and 31 on plate 27 are chosen so that the ratio of light and dark images (indicated at W and D in FIG. 5) to the color images 30R, 30G and 30B is in the ratio of 2:3.

While in practice images D, W, 30R, 30G and 30B are superimposed on each other on layer 24, these images have been shown separately in FIG. 5 to illustrate their relative locations and to clarify the description of the apparatus. Further, in FIG. 5, plate 27 has been shown schematically to be behind plate 14 for clarity.

Accordingly, when photoconductive layer 24 is scanned by an electron beam in the horizontal scanning direction, i.e., at right angles to the longitudinal axes of cylindrical lenses 18*a*, there is produced a composite color video signal from electrode 22 which includes the chrominance signal C produced by images 30R, 30B, and 30G and an index signal I produced by the light and dark imates W and D, in the manner shown in FIG. 5. By this arrangement, if the horizontal sweep frequency is selected at 2MHz and the ratio of light and dark images to color images is 2:3, the resulting chrominance signal 32 will have a sub-carrier frequency of 6MHz and the index signal frequency will be 4MHz.

The video signal obtained from electrode 22 of pickup tube 12 is fed, as indicated in FIG. 1, through an amplifier 35 to a band pass filter 36 which is effective to derive the index signal I of 4MHz, from the composite video signal. The video signal is also fed to a band pass filter 38 which is effective to derive the sub-carrier frequency of 6MHz (± 1.5MHz) from the video signal and to a third band pass filter 40 which is effective to derive luminance signal Y of frequencies less than 4 MHz, from the video signal.

Chrominance signal C as derived from band pass filter 38 is fed to a gate circuit 42, which circuit is held open by a control signal applied to terminal 44 during the horizontal scanning period of effective area S by gun 26. Accordingly, during that period in which the effective area S of photoconductive layer 24 is scanned, chrominance signals C derived from electrode 22 are permitted to pass through gate 42, and this signal is thence fed from gate 42 to detecting circuits 46, 48 and 50, corresponding respectively to each of the individual color signals 32R, 32B, and 32G.

Simultaneously, index signal I obtained from band pass filter 36 is supplied to a conventional wave shaping circuit 52 to provide a trigger signal for the detecting circuits. The trigger signal is fed from circuit 52 to synchronous oscillator 54 which is adapted to generate frequency signals of 2MHz. The resulting 2 MHz signal is supplied to multiplier circuit 56 which generates a 6 MHz signal whose frequency therefor corresponds to the sub-carrier frequency of chrominance signal C. The signal produced by multiplier circuit 56 constitutes a standard signal supplied to phase shifter 58 which produces three 6 MHz signals, shifted in phase by 120°, and sequentially applied to detector circuits 46, 48 and 50, respectively, to derive therefrom three distinct color video signals 60R, 60G, and 60B, respectively. These color video signals are thence fed to matrix circuit 62, along with luminance signal Y, which is first passed from filter 40 through delay circuit 64, to finally produce the three video color signals R, G, and B at the terminals of the matrix circuit.

In order to ensure high resolution color video signals with the above described modulating circuit, it is desirable to maintain phase synchronization between the standard signal produced by oscillator 54 and circuit 56 and the chrominance signal C as supplied to the detector circuits. This is required, since oscillator 54 will not be operating during the horizontal blanking period of pickup tube 12, and thus may loose the phase synchronization with the chrominance signal at the initiation of the next horizontal scan. Accordingly, lens screen 18 is provided with an additional set of cylindrical lenses or "lenticules" 18*b* whose longitudinal axes extend parallel to each other and parallel to lenses 18*a*. Lenses 18*b* have a pitch which is different from the pitch of lenses 18*a*, for example, twice the pitch of lenses 18*a*, and they are positioned on face plate adjacent lenses 18*a*, but outside of the effective area S, that is, no portion of the object O on which the apparatus 10 is focused, is projected on lenses 18*b*. However, half mirror 33, and plate 27, are proportional and positioned such that images w and d of the light and dark stripe pattern produced by plate 27 and light source 25 are projected through lenses 18*b* and onto the portion of photoconductive layer 24 adjacent effective area S as for example, at the area adjacent the starting position for each horizontal scan.

Referring again to FIG. 5, it will be seen that the sequential dark and light images *d* and *w*, respectively, produced on photoconductive layer 24 by lenses 18*b*, have a pitch which is twice the pitch of the light and dark images D and W produced by lenses 18*a*. Thus, when at the initiation of horizontal scanning by the electron beam from gun 26, and before the effective area of photoconductive area of layer 24 is reached, a second index signal *i* is generated by the light and dark images *w* and *d* which signal has a frequency that is one half of the frequency of index signal I, for example, having a frequency of 2 MHz. Therefore, at the initiation of horizontal scanning the composite signal composed of chrominance signal C and index signal I is preceded by second index signal *i*.

Index signal *i* is separated from the composite signal by a band pass filter 66 which is effective to derive frequency signals of 2 MHz. This signal is fed from filter 66 to a gate circuit 68 which is opened at the beginning of each horizontal scanning cycle by a control signal applied to a terminal 69 and conveniently obtained from the horizontal synchronization pulse. Thus, the 2 MHz index signal produced by lenses 18*b* is extracted from the signal derived from electrode 22, at the beginning of a horizontal scan, and this signal is supplied to a wave shaping circuit 70 to provide a trigger signal which is fed to oscillator 54 to control the starting position or phase of the signal produced by oscillator 54. Thus, the phase of the standard signal is synchronized with the phase of the chrominance signal thereby assuring the production of high resolution color signals from detecting circuits 46, 48 and 50 and matrix 62.

Figure 7:
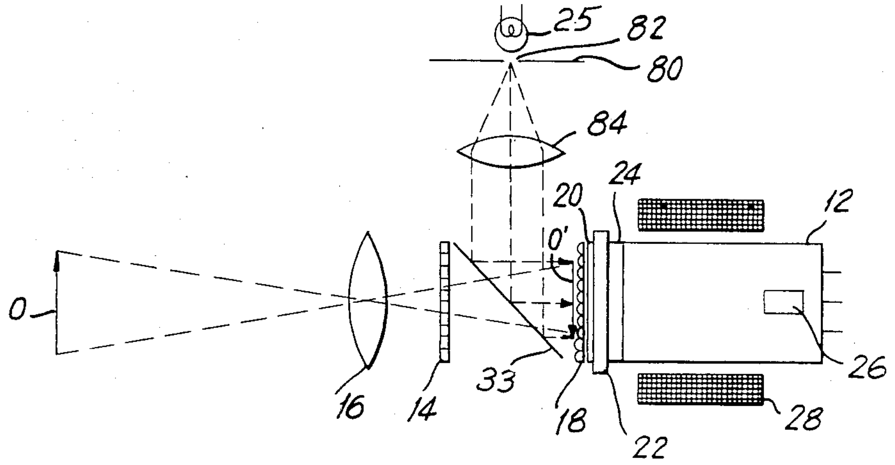
FIG. 7 is a schematic top plan view of another embodiment of this invention.
Figure 8:
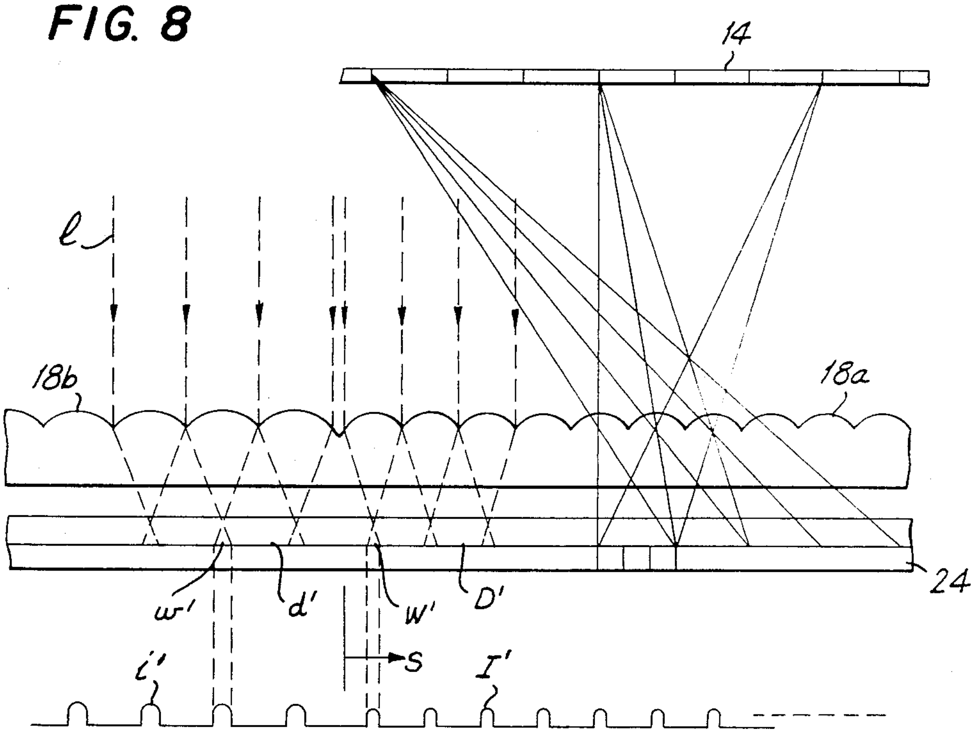
FIG. 8 is a schematic diagram, similar to FIG. 5, illustrating the color separation, light patterns, and signals produced by the apparatus of FIG. 7.

Another embodiment of the present invention is illustrated in FIGS. 7 and 8 wherein elements corresponding to elements discussed with respect to the embodiment of FIG. 1 have been identified by the same reference numerals.

In this embodiment, a shading plate 80 is provided in lieu of plate 27, and this plate 80 includes a narrow slit 82 through which light from source 25 is projected. The diverging light beams projected through slit 82 are converted into parallel light beams 1 by a lens 84 positioned adjacent plate 80 and these parallel light beams are thence reflected from mirror 33 onto lens scrren 18. As a result of the different pitches of cylindrical lenses 18*a* and 18*b* (see FIG. 8), parallel light beams are converged on photoconductive layer 24 in two different patterns of narrow strips of light W′ and *w*′, respectively. In between these narrow strips of light, relatively dark areas D′ and *d*′, corresponding to the dark areas D and *d* produced by plate 27 in the previously discussed embodiment are also formed on photoconductive layer 24. The pitch of the light and dark pattern *w*′ and *d*′ is twice the pitch of the pattern W′ D′ and thus index signals *i*′ and I′ are produced in output from tube 12 during horizontal scanning which correspond to the signals *i*, I of the embodiment of FIG. 1. These index signals are utilized in the same manner as the index signals *i* and I previously discussed to produce high resolution color video signals.

Figure 9:
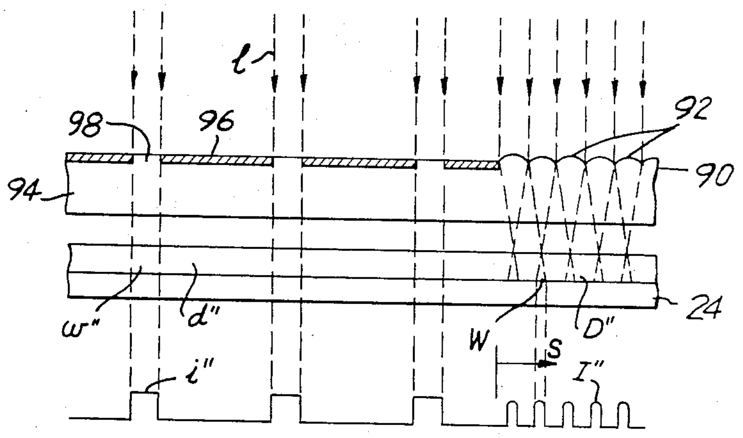
FIGS. 9 and 10 are schematic diagrams, similar to FIG. 8, of two other embodiments of the present invention.

FIG. 9 illustrates yet another embodiment of lens screen 90 adapted for use in accordance with the present invention. Screen 90 includes cylindrical lenses 92 corresponding substantially to lenses 18*a* of screen 18. In liew of the additional cylindrical lenses 18*b* of the prior embodiment, however, lens screen 90 is provided with a flat extension portion 94 having opaque strips 96 formed thereon, which strips extend longitudinally parallel to the axes of cylindrical lenses 92. The spaces 98 formed between strips 96 permit parallel light beams 1 from source 25 and lens 84 to pass through screen section 94 onto photoconductive layer 24 whereby light and dark images *w*″ and *d*″ are formed thereon. These are utilized to form the index signal *i*″, which has a different frequency than the signal I″ produced by the parallel light beams passing through cylindrical lenses 92. Both of these signals are fed from electrode 22 to a circuit corresponding to the circuit illustrated in FIG. 1 to produce high resolution phase synchronized color video signals in substantially the same manner as described above with respect to that embodiment.

Figure 10:
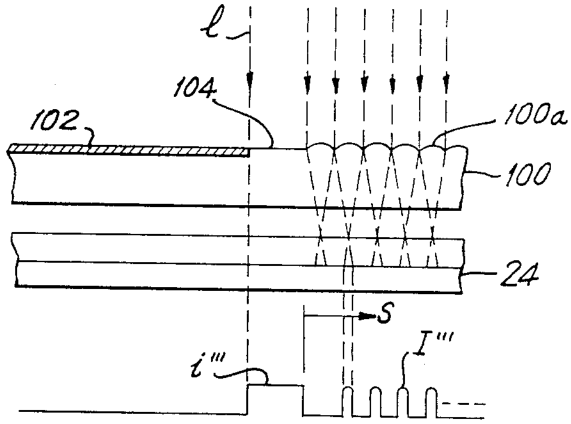

FIG. 10 illustrates yet another embodiment of a lens screen adapted for use in accordance with the invention. Lens screen 100 includes cylindrical lenses 100*a* corresponding to lenses 18*a* of the embodiment illustrated in FIG. 1, however, in this embodiment, the lens screen is provided with an elongated opaque portion 102 having a single transparent strip 104 therein adjacent the first cylindrical lens 100*a* on the screen. Transparent strip 104 permits parallel light beams 1 from light source 25 and mirror 33 to pass through the screen and be projected directly on photoconductive layer 24. In this manner, a single pulse or signal *i*‴ is produced during the period immediately before the horizontal scanning of effective area S of the screen corresponding to signal *i* of the embodiment of FIG. 1. This signal *i*‴ and the signal I‴ are fed to a modulation circuit similar to that described in the first embodiment to produce phase synchronized standard and chrominance signals as discussed above.

Accordingly, it is seen that in the above described embodiments first and second frequency index signals are conveniently produced to control the phase synchronization of the standard signal and of the subcarrier frequency of chrominance signal C. However, it sometimes happens that the velocity of the horizontal scanning by gun 26 changes, with the result that the subcarrier frequency of chrominance signal C and the frequencies of the index signals *i* and I change in accordance with this velocity change. As a result, the frequency and phases of the standard signal which is applied to the detecting circuits by phase shifter 58 varies with respect to the velocity of horizontal scanning so that the standard signal and the chrominance signal would not be in proper phase relation even with the utilization of the first and second index signals described above. This loss of synchronization is due to the fact that the phase of the signal developed by oscillator 54 is controlled by the index signal I so that when the phase of the index signal changes the phase of the standard signal supplied by phase shifter 58 will also change and thus, be out of phase with the chrominance signal.

Figure 11:
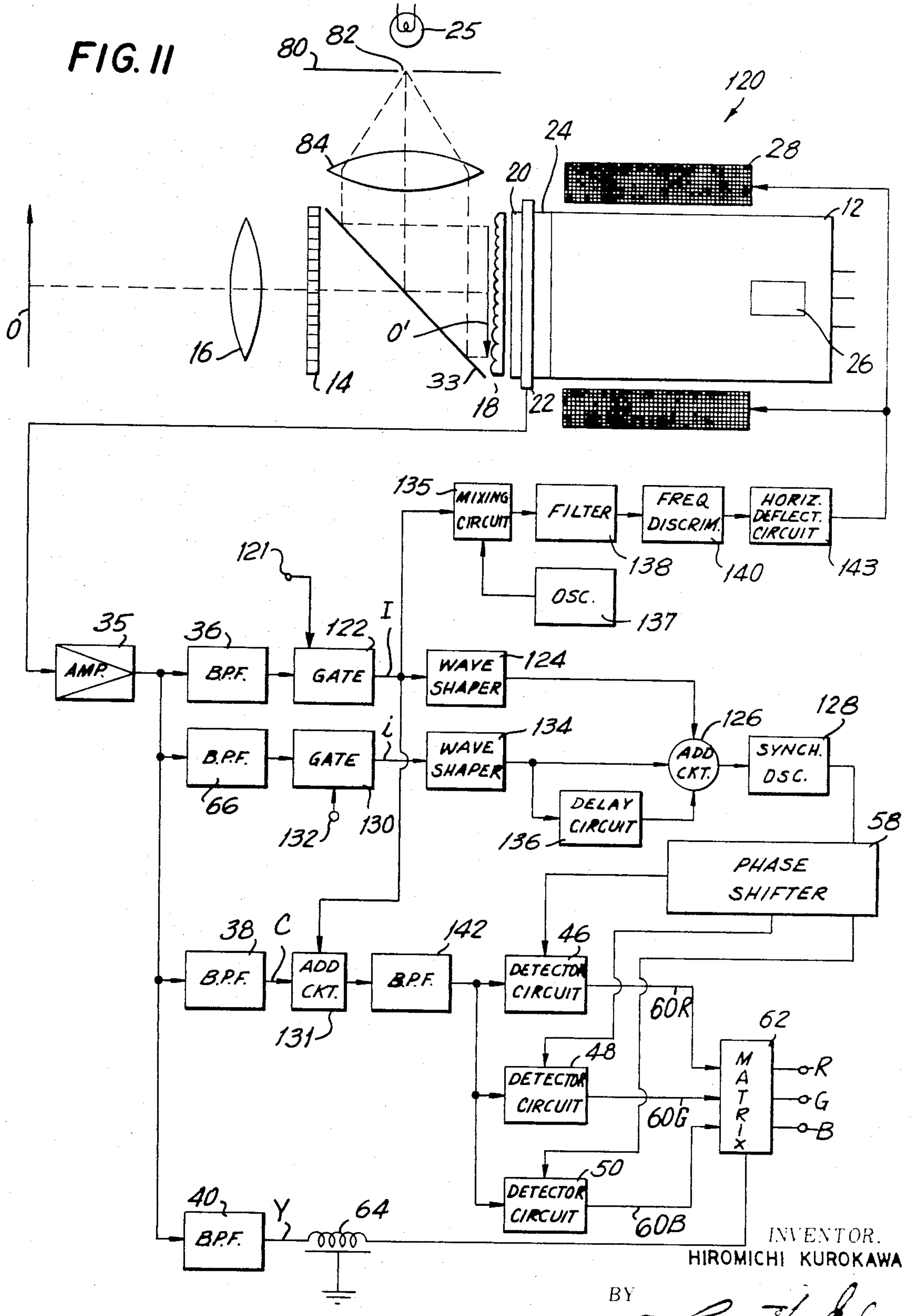
FIG. 11 is a schematic top plan view similar to FIG. 1, but showing another embodiment of the present invention by which the horizontal scanning velocity of the pickup tube is controlled.

To avoid loss of phase between the standard signal and the chrominance signal a system is provided which utilizes index signal I to control the horizontal scanning velocity of gun 26. This embodiment is illustrated in FIG. 11, wherein a color video signal generating apparatus 120 is illustrated which includes a pickup tube and index signal producing arrangement corresponding to the embodiment shown in FIG. 7, and therefore in which the same numerals have been applied to those elements of FIG. 11 which correspond to elements in the embodiment of FIG. 7. In this embodiment, first and second index signals I and *i* are produced in the manner described above, and these signals are fed through amplifier 35 to band pass filters 36, 66, 38 and 40 as in the modulation circuit illustrated in FIG. 1. Band pass filter 36 permits passage of the 4 MHz index signal I which is fed to a gate circuit 122, and the circuit 122 is held open during the horizontal scanning of the effective area S of pickup tube 12 by a control signal applied to a terminal 121 and which may be produced by the horizontal scanning circuit. Index signal I, derived from gate 122 is fed through a wave shaper 124 to an ADD circuit 126 and from the ADD circuit to a synchronous oscillator 128.

Second index signal *i* is separated from the signal output from electrode 22 by band pass filter 66 and in fed through a gate 130, which gate is held open during the initial portion of horizontal scanning prior to scanning of the effective area S of the pickup tube by a control signal applied to a terminal 132 from the horizontal scanning circuit. Index signal *i* is fed from gate 130 through a wave shaper 134 to ADD circuit 126 both directly and through a delay circuit 136. Delay circuit 136 is effective to delay index signal *i* by the horizontal scanning period, so that index signal *i*, which controls the phase of oscillator 128 during the horizontal blanking period, is provided at both ends of the horizontal sweep to keep oscillator 128 in operation, thereby avoiding loss of phase synchronization between the output of oscillator 128 and chrominance signal C produced by band pass filter 38. The phase controlled output standard signal from oscillator 128 is fed to phase shifter 58 which, as in the embodiment of FIG. 1, shifts the phase of the standard signal 120° and supplies the three phase-shifted signals to detector circuits 46, 48 and 50, respectively. Chrominance signal C, derived from band pass filter 38 is supplied to an ADD circuit 131, which receives the index signal I and chrominance signal C and this combined signal is fed through a band pass filter 142 which is effective to derive a beat signal and supplies this signal to detecting circuits 46, 48 and 50. The detecting circuits utilize the standard signals received from phase shifter 58 and the signal from band pass filter 142 to derive the color differential signals Y-R, Y-G and Y-B which signals are supplied to matrix circuit 62 in conjunction with the luminance signal Y derived from band pass filter 40 and delay line 64.

In this embodiment, index signal I is also supplied to a mixing circuit 135 which combines the index signal I with a constant frequency signal supplied from an oscillator 137. The constant frequency signal may typically have a frequency of 3.58 MHz. The resulting beat-down signal from mixing circuit 135, which in the example given has a frequency of 1.42 MHz, is separated from the output of circuit 135 by a band pass filter 138.

In the event that the phase of signal I changes as a result of a variation in the horizontal scanning velocity of the gun, the frequency of the beat-down filter 138 will vary in accordance therewith. This signal is fed to a frequency discriminator 140 which produces a voltage output corresponding to the change in frequency of the signal passed by filter 138. This voltage is supplied to the horizontal deflection circuit 143 in order to suitably control the velocity of horizontal scanning.

Figure 12:
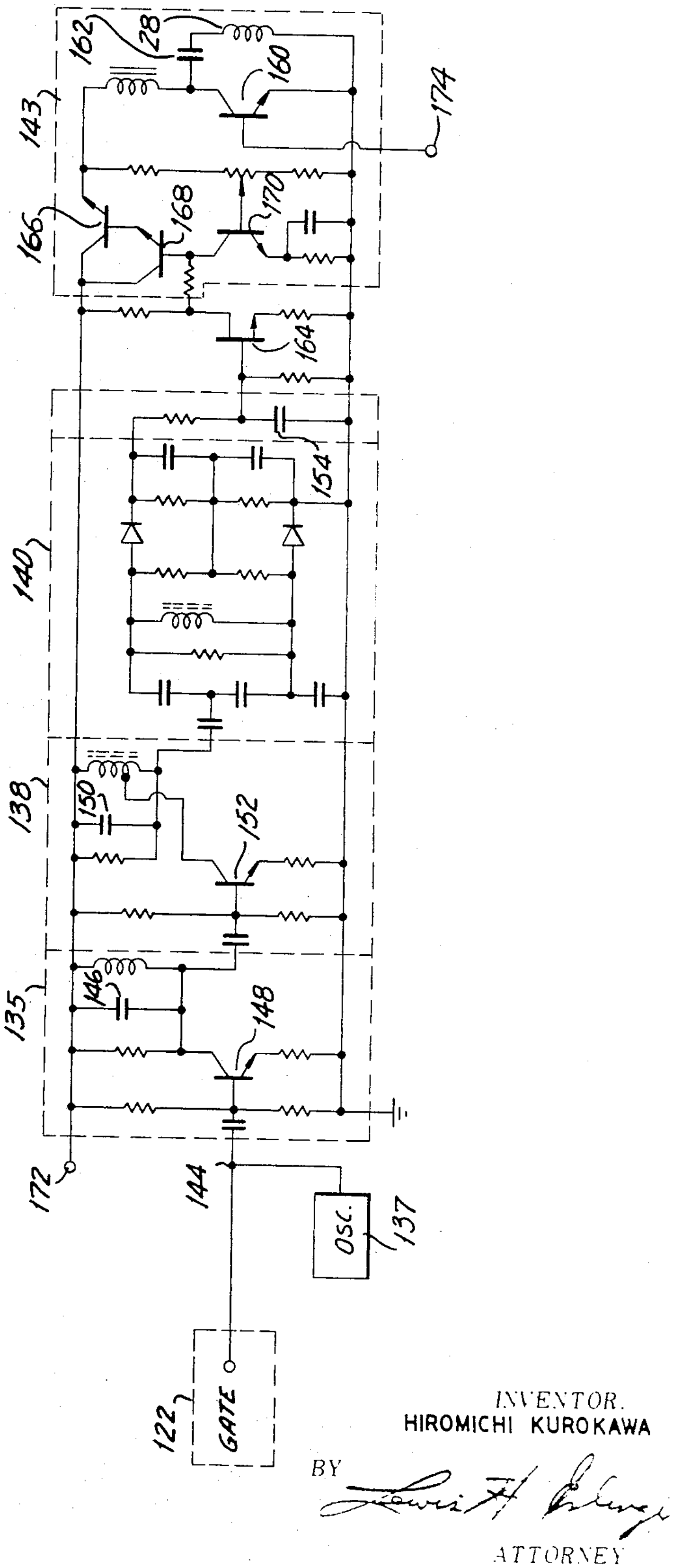
FIG. 12 is a schematic circuit diagram of certain of the components used in the apparatus of FIG. 10.

A more detailed description of the components utilized to control horizontal scanning velocity by means of index signal I will be provided below with reference to FIG. 12. As seen therein, index signal I from gate 122 and the reference frequency signal of 3.58 MHz from oscillator 137 are supplied to terminal 144 of mixing circuit 135. The mixing circuit has a resonant circuit 146 which, in the example given, is resonant at the frequency of 1.42 MHz, and a transistor 148 connected to resonant circuit 146 as shown. The output signal from the mixing circuit 135 is supplied to band pass filter 138 which, as shown, has a resonant circuit 150 effective to resonate at the frequency of the beat-down signal produced by mixing circuit 135, and a transistor 152 connected, as shown, to circuit 150 to thus produce an output signal which is supplied to frequency discriminator 140, which output signal is a function of the frequency of index signal I. The output of discriminator 140 is fed to an integration circuit 154 which produces a voltage output whose value is directly proportional to the frequency of the output signal from filter 138. This voltage is applied to horizontal deflection circuit 143 after amplification by a field effect transistor 164. The circuit 143 is shown to include a switching transistor 160, and a condenser 162 and the horizontal deflection coil 28 connected in parallel with the switching transistor. Circuit 143 further includes transistors 166 and 168 in a so-called "Derlington Connection" with each other, and a transistor 170 which provides a feed-back voltage to transistor 168. DC power is supplied to the circuits through a terminal 172, and a terminal 174 receives a horizontal synchronizing signal.

If the frequency of the index signal I decreases, as a result of a decrease in the velocity of horizontal scanning of the electron beam in pickup tube 12, the voltage output of integrating circuit 154 is similarly decreased, whereby the base and emitter potentials of transistor 168 increase. Accordingly, an increased horizontal deflection signal is supplied to coil 28 to increase the horizontal scanning velocity of electron gun 26. Conversely, should the frequency of the index signal I increase, as a result of an increased velocity of horizontal scanning, the base and emitter potentials of transistor 168 decrease, producing a lower value horizontal deflection signal in coil 28 so that the velocity of horizontal scanning is decreased.

Accordingly, it is seen that by the modulation circuit illustrated in FIG. 11, sub-carrier frequency of chrominance signal C and the frequencies of index signals I and *i* are kept constant and phase synchronized so that the production of high resolution color video signals is assured.

Although specific embodiments of the invention have been described in detail herein, it will be understood that the invention is not limited to those precise embodiments, and that various changes and modifications may be effected therein by one skilled in the art without departing from the scope or spirit of the invention.

WHAT IS CLAIMED IS:

1. A color video signal generating apparatus comprising image pickup means having scanning means for photoelectrically converting light projected onto said image pickup means into an electrical output, filter means interposed optically between an object to be televised and said image pickup means, said filter means having several regions respectively selecting light of different wave length ranges, a screen interposed between said filter means and said image pickup means, said screen having first separating lenses coacting with said filter means to divide an image of said object into respective color components projected onto a corresponding area of said image pickup means to establish in said electrical output a sequential chrominance signal in which the respective color video signals have the same sub-carrier frequency, said screen further including additional separating lenses extending over a second area of said image pickup means adjacent said corresponding area with said additional lenses having a greater pitch than said first lenses, means including a single light source for projecting a first pattern of alternating light and dark images through said first lenses onto said corresponding area of said pickup means and for projecting a second pattern of alternating light and dark images, of different pitch from said first pattern, through said additional lenses onto said pickup means, in said second area of the latter adjacent said corresponding area, said first pattern and said second pattern of images establishing first and second frequency signals in said electrical output, means for extracting said chrominance signal from said electrical output, means utilizing said first and second frequency signals for deriving a standard signal synchronized in phase and frequency with said sub-carrier of said chrominance signal, and means utilizing said standard signal for deriving said color video signals having the same sub-carrier frequency from said chrominance signal.

2. Apparatus as in claim 1, wherein said means for projecting said first and second patterns includes means for projecting light from said single source onto said screen, a plate optically interposed between said source and said screen and being formed of alternating strips of opaque and transparent material whereby patterns of alternate light and dark images are projected through said first lenses and said additional lenses to respectively provide said first and second patterns of images on said pickup means.

3. Apparatus as in claim 1, wherein said means for projecting said first and second patterns includes means for directing parallel light beams from said source to said screen, a major portion of said light beams being converged by said first separating lenses to project said first pattern of light and dark images on said corresponding area of the pickup means, and the remainder of said light beams being converged by said additional lenses to project said second pattern of light and dark images on said second area of the pickup means.

4. Apparatus as in claim 1, further including means for deriving a luminance signal from said electrical output.

5. Apparatus as in claim 4, wherein said means for deriving said luminance signal comprises a band pass filter.

6. Apparatus as in claim 1, wherein said means for deriving said standard signal includes means for extracting said first frequency signal from said electrical output, means for extracting said second frequency signal from said electrical output, a gate circuit receiving said second frequency signal and driven by a control signal derived from the horizontal blanking pulses applied to said image pickup means, and means receiving said first frequency signal and the output of said gate circuit for producing said standard signal in sychronized phase relation with the sub-carrier of said chrominance signal.

7. Apparatus as in claim 6, wherein said means for extracting said chrominance signal comprises band pass filter means.

8. Apparatus as in claim 7, including a second gate circuit receiving the output of said band pass filter means, said second gate circuit being driven by a control signal from said scanning means during the horizontal scanning period thereof.

9. Apparatus as in claim 8, wherein said means for deriving said color video signals comprises means for sequentially shifting the phase of said standard signal and detector circuits receiving the outputs of said phase shifting means and said second gate circuit.

10. Apparatus as in claim 1, including means responsive to said first frequency signal for controlling the velocity of horizontal scanning by said scanning means.

11. Apparatus as in claim 10, wherein said means for controlling the horizontal scanning velocity comprises means for providing a reference frequency signal and means receiving said reference signal and said first frequency signal for producing a voltage inversely proportional to the frequency of said first frequency signal, said voltage being supplied to said scanning means for controlling the horizontal velocity thereof.

* * * * *